Jan. 8, 1952

A. LONGACRE 2,582,205

COMPOUND PROTECTIVE DEVICE
FOR RADIO DETECTION SYSTEM

Filed Sept. 7, 1943

Inventor
ANDREW LONGACRE

By

Attorney

Jan. 8, 1952

A. LONGACRE 2,582,205

COMPOUND PROTECTIVE DEVICE FOR RADIO DETECTION SYSTEM

Filed Sept. 7, 1943

Inventor
ANDREW LONGACRE

Patented Jan. 8, 1952

2,582,205

UNITED STATES PATENT OFFICE 2,582,205

COMPOUND PROTECTIVE DEVICE FOR RADIO DETECTION SYSTEM

Andrew Longacre, Exeter, N. H., assignor, by mesne assignments, to the United States of America as represented by the Secretary of the Navy Application September 7, 1943, Serial No. 501,491

43 Claims. (Cl. 250—13)

This invention relates to protective electrical breakdown devices for operation with oscillatory electric voltages of a particular approximate frequency, and more particularly to protective electrical breakdown devices of a compound type employing more than one breakdown discharge element.

Protective electrical breakdown devices have been found particularly useful in high-frequency radio-echo detection and locating systems for preventing overloading of the receiver during operation of the transmitter and thereby making practical the operation of such a system with a single antenna for both the receiver and the transmitter.

Protective electrical breakdown devices for operation in connection with hollow pipe wave guides are sometimes provided in the form of a conducting barrier across a hollow pipe wave guide and having an aperture adapted to permit the transmission of low amplitude oscillations of a given frequency with very little attenuation and adapted to cause a breakdown to occur when oscillations of such frequency reach a high amplitude. This type of electrical breakdown device has advantages of simplicity of construction and ruggedness in operation, but when such a device is provided with a partially evacuated gap and is operated in a system in which the oscillations often reach high power levels, the breakdown is no longer confined to the space constituting the aperture, but spreads outwards, this making the location of the short circuit across the wave guide indefinite in nature. This is a disadvantage because, as will be presently pointed out, for best results in a transmitting and receiving system the protective electrical breakdown device should be so located that when a break occurs in it, a minimum interference with transmission of energy from transmitter to antenna results, which in the case of hollow pipe systems requires location of the breakdown at substantially an electrical half-wave length from the wall of the guide connecting the transmitter to the antenna.

By the use of two electrical breakdown devices in accordance with the present invention it is possible to obtain adequate receiver protection with the use of simple slit-type structures with a very low degree of interference with power transmission to the antenna even at high power operation of the transmitter. In addition, compound electrical breakdown arrangements in accordance with the present invention may also be constituted with at least one breakdown element of a type other than the simple slit-type, in which case the advantage is obtained that a great deal of breakdown discharge power is expended at a rugged gap structure of relatively simple construction, thereby lengthening the life of the second gap structure which may be of a more delicate type of construction which is adapted to operate at extremely low gap voltage during breakdown conditions, thereby affording a high degree of protective action. Objects of the invention, therefore, include the provision of an electrical breakdown protective device employing at least one breakdown element of a relatively simple structure which is adapted to operate in conjunction with high power transmission to provide adequate receiver protection with a minimum of interference with power transfer during transmission, and also the provision of an electrical breakdown device of the compound type in which a major part of the protective discharge is made to take place in a relatively simple and durable structure.

An essential feature of the invention is the spacing between the two electrical discharge elements or gaps of the compound electrical breakdown device. I have found that this spacing should correspond approximately to an odd number of electrical quarter-wave lengths, preferably a single quarter-wave length.

The invention is illustrated in the accompanying drawings in which:

Fig. 5 is a cross section of another form of apparatus embodying the present invention.

Figure 1:
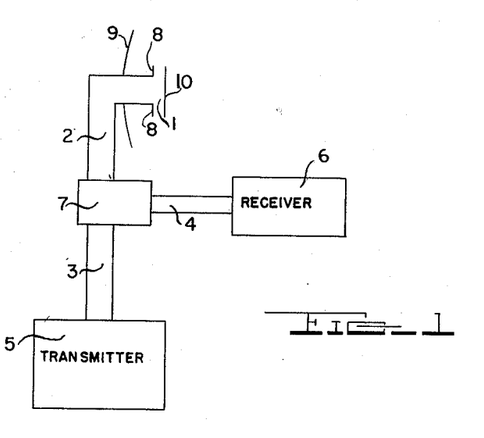
Fig. 1 is a diagram showing in general form the system in which apparatus constructed according to the invention is adapted to be used.

Referring to Fig. 1, the type of system in which the invention finds its chief utility is a system employing an antenna system 1 for both transmission and reception, the antenna system 1 being connected by means of wave guides 2, 3, and 4 to a transmitter 5 and a receiver 6. A junction 7 is provided for maintaining the desired relationship between the wave guides 2, 3, and 4 as hereinafter explained. The apparatus of this invention is adapted to be constructed at or near the said junction 7.

The antenna system 1 may include a dipole 8, a parabolic reflector 9 and an auxiliary reflector 10. The wave guides 2, 3, and 4 may be any form of transmission means for guiding oscillatory energy from one part of the system to another. Preferably they are either hollow conducting pipes of suitable dimensions or else coaxial conductor transmission lines.

Figure 2:
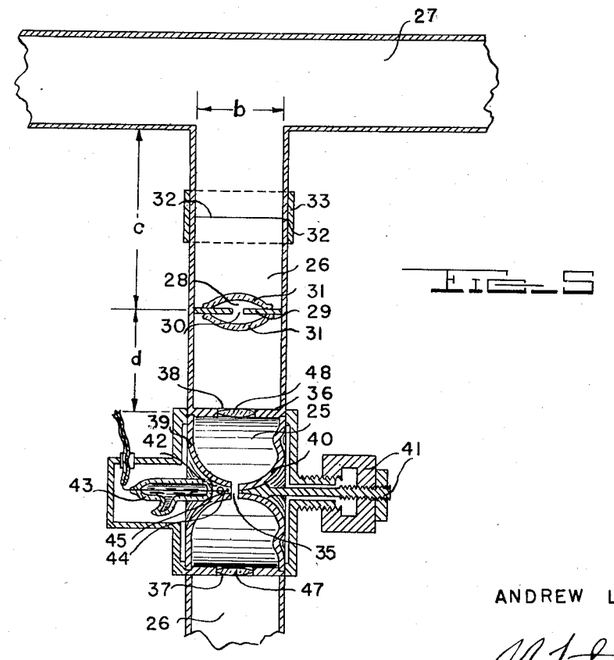
Fig. 2 is a cross section of one form of compound protective breakdown device according to the present invention.
Figure 3:
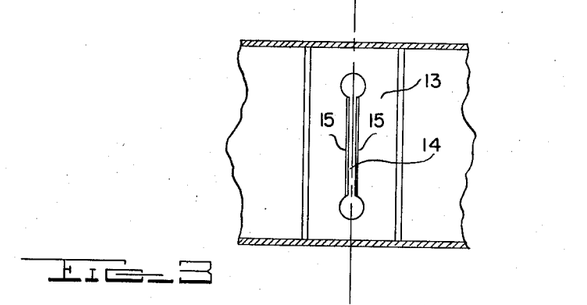
Fig. 3 is an elevation partly in section along the line 3—3 of Fig. 2.
Figure 4:
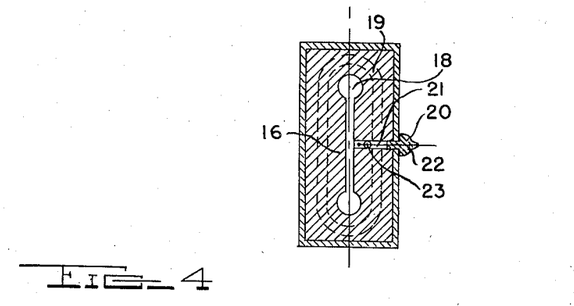
Fig. 4 is a cross section along the line 4—4 of Fig. 2.

Figs. 2, 3, and 4 show one form of apparatus embodying the present invention. The apparatus shown in Fig. 2 is adapted to constitute the junction 7 in a system such as that shown in Fig. 1. Two hollow pipe wave guides, of rectangular cross section, are shown forming a T-junction. The pipe 11 leads from the said junction towards a receiver or other sensitive device which it is desired to protect against overload by the apparatus embodying the present invention. The pipe 11 thus corresponds to the wave guide 4 of Fig. 1. The wave guide pipe 12 may serve to connect a transmitter with the antenna of the system, so that this pipe at one side of the T-junction corresponds with the wave guide 2 of Fig. 1 and on the other side of the T-junction corresponds with the wave guide 3 of Fig. 1.

The mouth of the wave guide pipe 11, where it forms the T-junction with the wave guide pipe 12 is obstructed by a transverse conducting diaphragm or barrier 13 having an aperture 14. The aperture 14 may have an elongated contour and should at least in part resemble a narrow slit. The long dimension of the aperture 14 should be substantially at right angles to the direction of the electric vector of the oscillation which the wave guide pipe 11 is adapted to transmit. The elongated aperture 14 and its surrounding conducting walls tend to form a resonant circuit; the aperture should therefore be so dimensioned that the resonant circuit constituted by it has a natural frequency of resonance in the neighborhood of the frequency at which it is desired to operate the apparatus, in order to reduce or eliminate reactive loading effects at the barrier 13 and its aperture 14.

Preferably, the barrier 13 and the aperture 14 are constructed as shown in Fig. 3, which is an elevation view of the mouth of the wave guide pipe 11 as seen from the wave guide pipe 12. As shown in Fig. 3, the aperture 14 is preferably arranged in the form of an elongated slit with terminal enlargements which may conveniently be circular in shape. These terminal enlargements of the aperture 14 are believed to reduce the frequency-sensitivity of the structure. They also facilitate the mechanical work of making the aperture. The sides of the narrow part of the aperture 14 are preferably formed by strips or facings of a refractory metal such as tungsten which is adapted to withstand the destructive effects of repeated electrical breakdown. Such strips of refractory metal are shown on Fig. 3 at 15. The rest of the barrier 13 is preferably constructed of copper, since it is desirable that it should be of a highly conducting metal in order to reduce losses in the system. Other metals, such as brass, are also suitable. Copper-plated or silver-plated materials may also be used.

The aperture 14 is sufficiently narrow in its central portion to promote the occurrence of an electrical breakdown discharge when voltages of the order of those set up in the wave guide system by the operation of the transmitter associated therewith are impressed across the said aperture. Because the resonant frequency of the aperture 14 is approximately the radio frequency of operation of the system, the presence of the obstructing diaphragm does not substantially affect the transmission of received signals of said frequency from the wave guide pipe 12 into the wave guide pipe 11. The barrier 13 with its aperture 14 thus constitutes a protective electrical discharge device.

In the wave guide pipe 11, at a suitable distance from the barrier 13 as hereinafter explained, is located another protective electrical discharge device 16 which is provided with means adapted to make it somewhat more sensitive than the protective electrical discharge device previously described. The device 16 comprises a transverse conducting diaphragm or barrier 17 similar to the barrier 13 having an aperture 18 therein similar to the aperture 14. A cross-section of this device in a plane perpendicular to the axis of the wave guide 11 passing through the line 4—4 of Fig. 2 is shown in Fig. 4. The device 16 is provided with means such as the glass envelope 19 for maintaining a partial vacuum in the aperture 18. The degree of partial vacuum within the glass envelope 19 and the nature of the residual atmosphere should be adapted, according to known principles, for the promotion of electrical breakdown across the aperture 18. The glass envelope 19 is preferably sealed to the metal barrier 17 by means of a metal-to-glass seal formed at high temperature, although other methods of providing a vacuum seal, such as a waxed joint, may also be used, especially for laboratory construction.

As an additional means for the promotion of electrical breakdown in the gap 18, the device 16 is provided with an electrode 20 insulated from the metal structure 17 and brought into the proximity of the aperture 18, although preferably not extending into said aperture. The electrode 20 may be brought into the neighborhood of the aperture 18 through a conduit 21 drilled into the structure 17 from its edge and communicating with the aperture 18. The electrode 20 enters the conduit 21 through a glass seal 22 which serves as an insulating support and also acts to maintain the partial vacuum in the aperture 18. An insulating bead 23 is also provided on the electrode 20 for maintaining clearance from the walls of the conduit 21. A high voltage is impressed upon the electrode 20 with respect to the conducting structure 17 which is connected electrically to the conducting walls of the valve guide pipe 11. The high voltage is preferably applied to the electrode 20 through a high resistance in order that the voltage may be automatically lowered when heavy discharges take place or upon the occurrence of an accidental short circuit. An illustrative value of voltage and resistance suitable for use in connection with the electrode 20 is a potential of 1,000 volts applied through a 5-megohm resistance.

The presence of an electrical potential between the electrode 20 and the conducting barrier 17 in the neighborhood of the aperture 18 tends to maintain a slight degree of ionization at a location close to that at which strong electric fields occur when the aperture 18 is excited by oscillations of large amplitude. The degree of ionization maintained in the neighborhood of the aperture 18 by the operation of the electrode 20 is not sufficient to cause more than a very slight loss of received signal amplitude when the transmitter is not in operation and there is consequently no breakdown across the aperture 18, but this slight degree of ionization is sufficient to aid materially the prompt initiation of breakdown when strong oscillations such as those caused by operation of the transmitter or by the reception of a signal sufficiently intense to damage the receiver are impressed upon the device 16. The device 16 may be made sufficiently sensitive to break down by operation of the oscillations transmitted in the guide 11 as a result of the oscillating voltages existing across the gap 14 during the breakdown discharge at the gap 14. Since the gap 14 is not provided with a partial vacuum atmosphere, it will have a relatively high resistance and the voltages thereacross would be a hazard to sensitive receiver if they were not shielded from the receiver by the relatively low-voltage discharge of the aperture 18.

The distance along the wave guide pipe 11 between the barrier 13 and the barrier 17 is made approximately equal to an odd number of quarter-wave lengths in the wave guide of the oscillations of the frequency at which the apparatus is designed to operate. The odd number of quarter-wave lengths chosen is preferably small in order to decrease the frequency-sensitivity of the apparatus. Accordingly the apparatus shown in Fig. 2 is of the configuration that would be expected where the said distance is equal to a single quarter-wave length.

It is important in a structure of the type of Fig. 2 employing a slit-type discharge element such as that shown at 13, 14 that the discharge should take place in the form of a relatively thin curtain. If, for example, such were not the case, the discharge in the gap 14 might spread out into the wave guide 12, thereby causing a discontinuity in the wave guide 12 that would lead to reactive, and possibly also resistive, loading of the wave guide 12. If instead of the discharge element 13, 14 one of the types shown at 17, 18 were substituted, such an undesirable spreading out of the discharge might be expected to result. The discharge might spread to the neighborhood of the glass envelope of the device, thus introducing considerable losses. The gap 14, however, operates at atmospheric pressure and in spite of the narrow dimensions of the gap, the discharge is a relatively high voltage discharge as compared with that occurring at the gap. In consequence, the discharge at the gap 14 is in the form of a relatively narrow curtain, even when the wave guide 12 carries oscillations at very high power levels, such as several hundred kilowatts or more. Because of the relatively high voltage of the discharge at the gap 14, it is desirable to furnish additional protection to the receiver. This is provided by the discharge element 17, 18 and its associated structure, which is adapted to operate upon voltages of the order of those transmitted down the wave guide 11 from the gap 14 during the time the gap 14 is broken down.

I have found that in order to obtain successful operation of a compound structure such as that just described it is essential that the two discharge elements be separated by a distance which is approximately equal to an odd number of electrical quarter-wave lengths. If the separation were a half-wave length, on the other hand, an unsatisfactory type of operation would result, because only the more sensitive gap would break down, since it would effectively short circuit the less sensitive and more resistant gap. In consequence the discharge would spread out in the evacuated space in the neighborhood of the more sensitive gap.

Although the discharge gap 14 in the apparatus just described is intended to be less sensitive than the discharge gap 18, the discharge gap 14 should nevertheless be sufficiently sensitive to break down during all normal operation of the transmitter, for although the receiver will be protected by the gap 18 if the gap 14 should fail to break down, the gap 18 is so located in the wave guide 11 that, unless the gap 14 breaks down, reflections will be set up in the wave guide 12 which will substantially prevent energy from passing down the wave guide 12 past the junction between the wave guides 12 and 11, and moreover, acceptance of energy by the wave guide 11 will not be inhibited and considerable power may be expended in the breakdown discharge. It is possible that the location of the gap 18 may function to assist the gap 14 to break down in the case of a slight delay in the firing of the gap 14, because the gap 18 would appear to be favorably located for such action, but it is not at present possible to verify any such supposition. When the transmitter connected to the wave guide 12 is operated in such a manner that it transmits substantially rectangular pulses of radio-frequency energy, which is to say signals of which the amplitude envelope is in the form of intermittent rectangular pulses, it is relatively easy to provide a breakdown element 13, 14 with a gap 14 of such dimensions that a breakdown will occur consistently during each pulse. The radio-frequency energy in such pulses rapidly attains a high power level. Under such circumstances the gaps 14 and 18 will fire substantially simultaneously.

An advantageous feature of the apparatus of Fig. 2 is that a major portion of the total protective discharge power expended is dissipated at the gap 14, which may, as described, be provided with a rugged and relatively simple construction. The construction of the discharge element 13, 14 is not only capable of withstanding relatively long periods of use, but is also simple to manufacture and may readily be constructed for easy replacement. Since the discharge element 17, 18 is subjected only to oscillatory voltages of the order of magnitude of those existing across the gap 14, the energy dissipation at the gap 18 may be kept at a low level even though the gap 18 may have a low voltage breakdown characteristic, so that the life of the element 17, 18 is appreciably extended as compared with the life of such an element when used alone for the protection of a receiver in a comparable system. The gap 18 may be made sufficiently sensitive to break down upon reception of echoes from very close objects or other high intensity signals which might damage the receiver.

It will be noted that neither of the discharge elements shown in Fig. 2 is adapted to provide much, if anything, in the way of resonant transformation of voltage between the wave guides and the discharge gap. If desired, a type of breakdown apparatus employing such resonant transformation may be substituted for the more sensitive gap, as illustrated in Fig. 5. Although discharge elements employing resonant transformation generally have the advantage of increased sensitivity, they generally introduce greater losses of received signal energy than do structures of the type shown in Figs. 2, 3, and 4, On account of these losses it is preferred not to provide both discharge elements in a compound device in the form of breakdown apparatus providing for resonant transformation.

In Fig. 5 are shown wave guide pipes 26 and 27 corresponding to the pipes 11 and 12, respectively, of Fig. 2. An electrical breakdown device 28 corresponds to the barrier 13 and its aperture 14. The device 28 comprises a conducting barrier 29 located transversely of the wave guide 26 and provided with an aperture 30 similar to the aperture 18 shown in Figs. 2 and 4. The device 28 also includes a glass envelope 31 for maintaining a partial vacuum in the aperture 30, thus making the device 28 somewhat more sensitive than the corresponding structure 13, 14 of Fig. 2. A relatively slight degree of vacuum is employed, however, such as one corresponding to about 10 cm. of mercury, so that the discharge may be in the form of a thin curtain.

It will be noted that the device 28 is not located at the T-junction as is the corresponding structure 13, 14 of Fig. 2, but instead the device 28 is located in the pipe 26 at some distance from the said junction. The distance between the barrier 29 and the mouth of the pipe 26 where it forms a T-junction with the wave guide pipe 27 is preferably approximately equal to an integral number of electrical half-wave lengths. This electrical length, shown at $c$ on Fig. 5, on account of the "end effects" at the T-junction is very slightly less than an integral number of halves of the wave length of the oscillations in the guide 26. Preferably the distance $c$ is a single electrical half-wave length. The electrical half-wave length dimension $c$ in a guide in which $b/\lambda_g$ is 0.25 is equal to 0.463 of the wave length ($\lambda_g$) in the guide, $b$ being the width of the guide in the "electric plane." For a value of $b/\lambda_g$ of 0.33, the electrical half-wave length dimension $c$ is $0.457\lambda_g$.

The purpose of this adjustment of the distance between the device 28 and the mouth of the wave guide pipe 26 is to improve energy transfer between transmitter and antenna and to mitigate the acceptance of energy by the wave guide 26 and the device 28, after a breakdown has occurred in the latter. For this purpose it is desired that when such breakdown occurs, the wave guide pipe 26 should present a very low impedance at its mouth in order to produce a minimum discontinuity in the walls of the wave guide 27 and therefore promote the transmission of energy from the transmitter to the antenna rather than its dissipation in the protective electrical breakdown device. Such a result is readily achieved by placing a breakdown slit directly across the mouth of the wave guide leading to the receiver as shown in Fig. 2. A similar result may also be reached by making the distance between the location in the wave guide where the breakdown occurs and the mouth of the wave guide where it abuts on and communicates with the wave guide 27 approximately equal to an integral number of half-wave lengths, slightly modified as aforesaid. When the discharge device 28 is located as in Fig. 5 at some distance from the T-junction, it is usually convenient to provide a joint in the wave guide 26 between said device and the T-junction to facilitate assembly, dismounting and inspection of the apparatus. Because oscillations of fairly large amplitude occur in that portion of the wave guide 26 during periods of transmitter operation, it is desirable to locate this joint at approximately an odd number of electrical quarter-wave lengths from the barrier 29, in order that it may be located at a position where relatively little current occurs during periods of transmitter operation. Such a joint is shown at 32, in this case a simple butt joint provided with a clamping sleeve 33. The locating of this joint as aforesaid does not dispense with the desirability of providing good electrical contact at said joint although it tends to reduce the losses at said joint upon transmission, because during periods when the transmitter is not in operation and it is desired to transmit received signals to the wave guide 26, the wave guide 26 operates as a non-resonant transmission means rather than as a resonant transmission means and good electrical contact is desirable for the reduction of losses in transmission of received signals.

If desired, the structure 13 of Fig. 2 might be located, as the structure 29 of Fig. 5, at an electrical half-wave length from the junction, with the structure 17 being located an additional electrical quarter-wave length farther away from the junction. Such an arrangement may be found more convenient than the precise arrangement shown in Fig. 2.

In the apparatus shown in Fig. 5 the more sensitive electric breakdown discharge element of the compound breakdown device arrangement includes a discharge gap 35 centrally arranged in a resonator structure, the latter being adapted to provide resonant transformation between the wave guide 26 and the gap 35 so that the voltage appearing in the wave guide 26 may be stepped up to the gap 35 and then stepped down again to the part of the wave guide 26 leading toward the receiver input. The said resonator structure includes a substantially cylindrical wall 36 provided with apertures 37 and 38 for coupling in and out of the wave guide 26 for the exchange of oscillatory energy between the resonator structure and the wave guide 26, and also end walls 39 and 40 which approach each other at the center to form the gap 35, the end wall 40 being flexible and being provided with means 41 for its adjustment, whereby the gap clearance and the tuning of the resonating structure may be varied. The resonator wall 39 is provided with a central passage 42 sealed off in a suitable fashion, as by a glass tube 43. An electrode 44 is provided within the central passage 42, supported by the glass tube 43 and spaced by a bead 45, the electrode 44 performing the same function as the electrode 20 of Figs. 2 and 4. The apertures 37 and 38 are provided with glass windows 47 and 48 sealed to the cylindrical wall 36 for the purpose of maintaining partial vacuum in the gap 35 and the associated parts of the resonator, the partial vacuum in this instance being preferably of the order of 7 mm. of mercury. Because the configuration of the resonating structure of the apparatus 25 differs considerably from the configuration of the wave guide 26, it is not practical to attempt to express the distance between the gap 35 and the gap 30 in terms of the physical wave length of the oscillations in question in the guide 26. But since the apparatus may be considered as a resonator coupled to a wave guide by means of a common inductive susceptance which in this case is provided by the coupling aperture 38, it is quite practical to determine the spacings between the breakdown elements in terms of the distance shown at $d$ on Fig. 3, between the plane of the coupling aperture 38 and the plane of the aperture 30. This will be somewhat less than an odd number of quarter-wave lengths of the oscillations in the guide, the amount of the difference between this distance and the odd number of quarter-wave lengths being determined by the inductive susceptance or "loading effect" of the coupling aperture 38 as it appears when breakdown occurs in the resonator 25.

The exact modification of the odd quarter-wave length spacing necessary to obtain the dimension d shown on Fig. 5 for a given electrical discharge apparatus of the resonator type such as the apparatus 25 may be determined by experiment by connecting the discharge apparatus to a wave guide to which is connected a source of oscillations of the frequency in question, and ascertaining the standing wave pattern occurring in the said wave guide when a breakdown is taking place in the electrical discharge apparatus. A maximum voltage location will be found at points electrically an odd number of quarter-wave lengths distant from the discharge device and the distance between such points of voltage maximum and the plane of the coupling aperture will give values of the distance d, referring to Fig. 5, suitable for the electrical discharge device in question.

The advantage, characteristic of the present invention, that a major part of the protective discharge is made to take place in a relatively rugged and easily replaceable element, thus extending the life of the other parts of the device, may be realized in the application of the present invention to systems in which the components are connected by coaxial conductor wave guides. An illustrative arrangement of this type is shown in Fig. 6.

Figure 6:
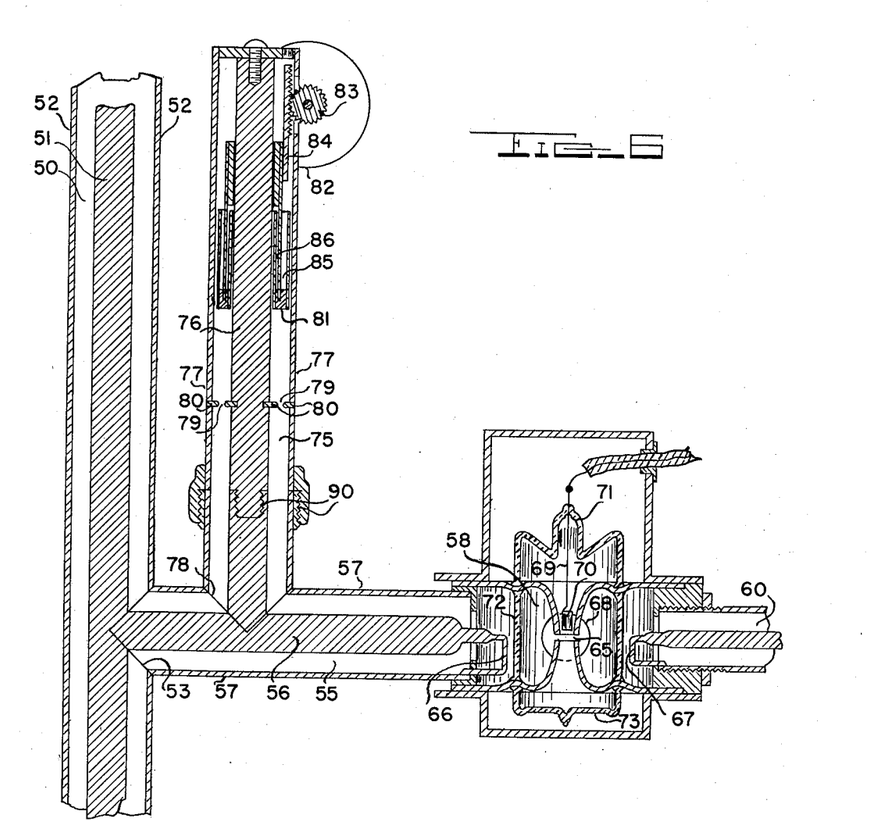
Fig. 6 is a cross section of still another form of apparatus embodying the present invention, in which coaxial conductor wave guides are employed instead of the hollow pipe wave guides shown in Fig. 5.

In Fig. 6 the coaxial conductor wave guide leading from the transmitter to the antenna is shown at 50 and includes an inner conductor 51 and an outer conductor 52. The coaxial conductor wave guide 50 forms a junction 53 with the coaxial conductor wave guide 55, which comprises the inner conductor 56 and the outer conductor 57. The coaxial conductor wave guide 55 is coupled to a coaxial conductor wave guide 60 through the resonator 58 of a sensitive protective electric breakdown device of the type adapted to provide resonant voltage transformation upward between the wave guides 55 and 60 and the gap 65 of the resonator 58. The wave guide 60 leads to a receiver. The resonator 58 is interposed between the wave guides 55 and 60 in the same manner as in Fig. 5 the resonator 25 is interposed in the wave guide 26. The wave guide 55 is coupled to the resonator 58 by means of a loop 66 and the wave guide 60 is similarly coupled to the resonator 38 by means of a loop 67. The coupling between the wave guide 60 and the resonator 58 may be adjusted by rotating the wave guide 60 on its axis with respect to the structure of the resonator 58. The resonator 58 is adapted to be tuned by means of a plunger 68 which is adapted to vary the volume of the resonator cavity. An electrode 69 serves the same function as the electrode 44 of Fig. 5. The electrode 69 is provided with a small cup 70 at its extremity which is adapted to hold a small quantity of a radioactive material for the purpose of promoting ionization in the immediate neighborhood of the electrode 69. A partial vacuum, preferably of the order of about 7 mm. of mercury, is maintained with the aid of a glass envelope made of three parts, 71, 72, and 73. The electrical breakdown device which includes the resonator 58 and its associated structure constitutes the more sensitive protective breakdown element of the compound device of this invention. The less sensitive breakdown element, instead of being provided immediately in the wave guide 55, is provided in a branch wave guide, and so located therein that, when the branch wave guide is connected where the breakdown device would otherwise be located, an equivalent effect is obtained. The branch wave guide is shown at 75 and includes an inner conductor 76 and an outer conductor 77. It forms a junction 78 with the coaxial conductor wave guide 55. Suitably located in the wave guide 75 as further described below are one or more gaps 79 formed by means of electrodes 80. Located in the wave guide 75 at a greater distance from the junction 78 and the gap 79 is an adjustable short-circuiting termination 81 which is adapted to be actuated by a knob 82, by means of a pinion 83 and a rack 84. The short-circuiting termination 81 is preferably of the non-contact type, provided with coaxial internal annular cavities 85 and 86 so dimensioned as to cooperate with the annular clearances between the structure 81 and, respectively, the conductors 76 and 77 to provide an effective radio-frequency short circuit in the plane of the lower face of the structure 81. For this purpose the said annular clearances should be approximately a quarter-wave length long.

The structure 81 is adjusted axially in position so that its lower face is substantially an odd number of electrical quarter-wave lengths, preferably three quarter-wave lengths, from the junction 78. Consequently, when the transmitter is not in operation and none of the discharge gaps are broken down, the branch wave guide 75 acts as a resonant stub-support for the wave guide 55, presenting a high impedance at the junction 78 and, therefore, not substantially interfering with the transmission of energy from the junction 53 toward the wave guide 60.

The gaps 79, which are substantially in a plane perpendicular to the axis of the wave guide 75 are located at an integral number of electrical half wave-lengths, preferably a single half wave-length, from the junction 78, so that when the transmitter is in operation and a breakdown accordingly takes place at the gap 79, the wave guide 75 will provide a virtual short circuit at the junction 78, thereby preventing energy from proceeding towards the wave guide 60, except for voltages of the order of magnitude of the voltage at the discharge gaps 79. The disturbances proceeding down the wave guide 55 towards the wave guide 60 as a result of the oscillatory voltages at the gaps 79, which are relatively high voltage discharge gaps and in this sense similar to the gap 14 of Fig. 2, will cause a breakdown in the gap 65 of the resonator 58, the resonator 58 being adapted to cause the voltage of the gap 65 to be considerably greater than the voltage across the loop 66, on account of resonant transformation.

The wave guide 75 is preferably provided with a joint, such as the threaded joint 90. For the purpose of this joint, the segments of the outer conductor 77 are provided with threaded sleeves one externally threaded and the other internally, one of said sleeves being soldered to each of said segments of the conductor 77. Other forms of joints may also be used. The joint 90 is adapted to permit the ready removal of the upper portion of the wave guide 75 which includes the gap 79. In this manner the aforesaid structure may readily be replaced while the used structure may be repaired by the provision of new electrodes 80.

The distance between the joint 78 and the joint 53 should be substantially an electrical quarter-wave length or any other reasonably small number of electrical quarter-wave lengths. In consequence, when a breakdown occurs at the gap 79 and a virtual short circuit is provided at the junction 78, the wave guide 55 will present a high impedance at the junction 53, inhibiting the acceptance of undesired amounts of energy by the wave guides 55 and 75 and promoting the transfer of energy in the wave guide 50 past the junction 53. It is to be noted that in coaxial conductor wave guides the physical dimensions corresponding to an electrical wave length is equal to the wave length of radiation of the same frequency in open air, except for a modification of which account should be taken in the event that pieces of dielectric material are located inside the portions of coaxial conductor wave guide under consideration. Junctions such as the junction 53 and the junction 78 produce "end effects," particularly in the branch guide, and these must be taken into account in the determination of the desired physical dimensions. These end effects have been, and may readily be determined by experiment and are by this time well known to those skilled in the art.

In accordance with the principles of the present invention the distance between the coupling loop 66 and the junction 78 should be substantially equal to an odd number of electrical quarter-wave lengths, with due allowance made for the inductive loading effect at the loop 66 when a breakdown is present at the gap 65 of the resonator 58. This loading is quite considerable, so that for convenience of physical construction it is desirable to provide a distance of three electrical quarter-wave lengths between the junction 78 and the resonator 58, instead of a single electrical quarter-wave length which would result in undue crowding of the components. When such a length is provided for this distance, the loading effect of the loop 66 during conditions of breakdown is sufficient to make the desired physical length from the end of the loop 66 to the axis of the wave guide 75 approximately equal to, or even slightly less than about ⅝ wave length. The amount of loading that occurs at the loop 66 is believed to vary with the particular configuration of the loop and that of the resonator.

Although as pointed out in the above example, the principles of the present invention are applicable to arrangements of apparatus utilizing coaxial conductor wave guides as well as to apparatus employing hollow conducting pipe wave guides, apparatus according to this invention is especially useful in systems employing hollow pipe wave guides in connection with transmitting apparatus of relatively high power. In such systems, at least one of the breakdown elements of the compound breakdown device of the present invention may take the extremely simple form of a suitably slitted diaphragm or barrier located transversely of the wave guide leading toward the receiver or other apparatus being protected. Such a breakdown slit device is not only simple in construction but is also compact and of convenient shape. Such a slitted conducting barrier may be so mounted across the pipe wave guide in question in such a manner that it may be readily removed and replaced by another.

What I desire to claim and secure by Letters Patent is:

1. In a pipe wave guide system, a protective electrical breakdown device including two conducting barriers located transversely of a pipe wave guide leading to a sensitive device, each of said barriers having an aperture of elongated contour and being so dimensioned that it is resonant at the frequency of oscillations transmitted by said system and that a discharge will occur across said aperture at a predetermined amplitude of said oscillations, said barriers being spaced from each other by a distance corresponding substantially to an odd number of electrical quarter-wave lengths of said waves in said guide, that one of said barriers which is nearer to said sensitive device being provided with means to maintain a partial vacuum in the space defined by the aperture of said barrier and with an auxiliary electrode whereby an ionizing potential may be applied in the immediate neighborhood of said aperture.

2. In a radio-frequency electrical system, a compound protective breakdown device of the electrical breakdown type for the protection of a sensitive device connected to said system comprising in combination two electrical breakdown gaps spaced in a wave guide by a distance approximately equal to an odd number of electrical quarter-wave lengths in said guide of electromagnetic waves to be transmitted in said system, that one of said electrical breakdown gaps which is nearer to said sensitive device being provided with means to maintain a partial vacuum in the space constituting said gap, the other of said electrical breakdown gaps so dimensioned that a discharge will occur across said gap at a predetermined amplitude of oscillations in said system thereby to produce a breakdown discharge in the form of a relatively thin curtain.

3. In a hollow wave guide system, protective apparatus comprising first and second protective electrical breakdown devices, said protective devices being positioned within said wave guide and transversely thereof and being spaced one from the other as measured from their respective regions of breakdown a distance substantially equal to an odd number of quarter-wave lengths of the energy conducted within said wave guide.

4. Apparatus as in claim 3 and means surrounding the breakdown region of said second device for rendering said second protective device more sensitive than said first protective device.

5. Apparatus as in claim 3 wherein said first protective device includes a conducting barrier having an aperture of such dimensions that an electrical breakdown discharge will occur across said aperture at a predetermined potential, and said second protective device includes a second conducting barrier having a second aperture of such dimensions that an electrical breakdown discharge will occur across said second aperture at a second predetermined voltage, and means associated with said second conducting barrier and said second aperture for maintaining a partial vacuum in the space defined by said second aperture.

6. Apparatus as in claim 3 wherein said first protective device includes a conducting barrier having an aperture of such dimensions that an electrical breakdown discharge will occur across said aperture at a predetermined potential, and said second protective device includes a second conducting barrier having a second aperture of such dimensions that an electrical breakdown discharge will occur across said second aperture, means associated with said second barrier and said second aperture for maintaining a partial vacuum in the space defined by said second aperture, and means located within said last-mentioned means for constantly maintaining a region surrounding said second aperture in an ionized state.

7. In a system for transmitting and receiving by means of the same antenna and which includes pipe wave guides adapted to transfer electro-magnetic waves and leading respectively toward a transmitter, a receiver and an antenna, protective apparatus comprising first and second electrical breakdown devices positioned within said wave guides and being separated from each other at their respective points of breakdown by substantially an odd number of quarter-wave lengths of the energy within said guides, said first breakdown device being located at substantially an integral number, including zero, of electrical half-wave lengths from a suitable junction of said wave guides, said first breakdown device requiring a larger voltage to cause electrical breakdown therein than is required by said second breakdown device.

8. In a wave guide system, a compound protective device which includes a conducting barrier having an aperture of such dimensions that an electrical breakdown discharge will occur across said aperture at a predetermined potential, a resonator structure having a discharge gap centrally arranged therein, said discharge gap being separated from said conducting barrier by substantially an odd number of quarter-wave lengths of the energy within said guides, means surrounding said resonator for maintaining a partial vacuum in the region of said discharge gap, and means disposed within said last-mentioned means for maintaining a region surrounding said discharge gap in an ionized state.

9. In a wave guide system, a compound protective device comprising first and second electrical discharge devices positioned within said wave guide, said first discharge device comprising a conducting barrier having a resonant aperture therein positioned transversely of said wave guide, said aperture being of such dimensions that an electrical discharge will occur thereacross at a first predetermined voltage, said second discharge device comprising a resonant structure having a discharge gap therein, and means for maintaining a partial vacuum in the region of said gap for promoting electrical breakdown thereacross at a lower potential than said first predetermined potential, said first and second devices being separated at their respective points of breakdown by substantially an odd number of quarter-wave lengths of the energy in said wave guide.

10. In a system for transmitting and receiving by means of the same antenna which includes a junction of pipe wave guides, one of which is connected to a receiver, compound protective apparatus comprising a first conducting barrier of a shape corresponding to the internal dimensions of said one wave guide, said barrier being positioned transversely of said one guide and having an elongated aperture with its long dimensions oriented perpendicularly to the electric vector of oscillations transmitted by said guides, the width of said aperture being sufficiently small, at least for part of its length, to permit the establishment of an electrical breakdown discharge across said aperture when oscillations in said wave guide exceed a predetermined amplitude, said aperture being further dimensioned and shaped to resonate at a frequency approximately equal to that employed for said transmitting and receiving, a second conducting barrier positioned transversely of said one wave guide between said first barrier and said receiver and spaced from said first barrier by approximately an odd number of quarter-wave lengths of said oscillations, said second barrier having a second aperture of elongated contour being dimensioned for resonance at the frequency of said oscillations, and being further dimensioned for incurring electrical discharge thereacross at a predetermined level, and means surrounding said second barrier for maintaining a partial vacuum in at least a part of said second aperture.

11. Apparatus in accordance with claim 10 which includes means inserted into said second aperture for maintaining the region in the neighborhood thereof in an ionized state.

12. In a wave guide system, compound protective apparatus comprising first and second electrical breakdown devices positioned within said guide, said first device including a conducting barrier having an elongated aperture therein positioned transversely of said guide, said apparatus being dimensioned for resonance at the frequency of oscillations transmitted by said system, and being further dimensioned for incurring a sharply localized discharge thereacross when the oscillations in said system exceed a predetermined energy level, said second device including resonant voltage transformation means having a discharge gap located therein, said resonant transformation means providing a higher voltage across said discharge gap than that appearing in said guide whereby said second device is more sensitive than said first device, said discharge gap being spaced from said conducting barrier a distance of approximately a quarter wave length of the oscillations within said guide.

13. Apparatus in accordance with claim 12 wherein means are secured to said barrier for maintaining a partial vacuum in the region of said aperture.

14. Apparatus in accordance with claim 12 which includes means surrounding said resonant transformation means for maintaining a partial vacuum in the region of said discharge gap.

15. Apparatus in accordance with claim 12 which includes means surrounding said resonant transformation means for maintaining a partial vacuum in the region of said discharge gap, and means for producing ionization in the region surrounding said gap.

16. Apparatus in accordance with claim 12 which includes means secured to said barrier for maintaining a partial vacuum in the region of said aperture, means surrounding said resonant transformation means for maintaining a partial vacuum in the region of said discharge gap, and means for producing ionization in the region surrounding said gap.

17. In a wave guide system, compound protective apparatus comprising first and second electrical breakdown devices positioned within said guide, said first device including a conducting barrier having an elongated aperture therein positioned transversely of said guide, said aperture being dimensioned for resonance at the frequency of oscillations transmitted by said system, and being further dimensioned for incurring a sharply localized discharge thereacross when the oscillations in said system exceed a predetermined energy level, said second device including a second conductive barrier having an elongated aperture therein resonant at the frequency of oscillations transmitted by said system, said resonant aperture providing a higher voltage across said aperture than that appearing in said guide whereby said second device is more sensitive than said first device, said second barrier being spaced from said first barrier a distance of approximately a quarter wave length of the oscillations within said guide.

18. Apparatus in accordance with claim 17 wherein means are secured to said second conducting barrier for maintaining a partial vacuum in the region of said resonant aperture.

19. Apparatus in accordance with claim 17 which includes means secured to said second conducting barrier for maintaining a partial vacuum in the region of said resonant aperture, and means for producing ionization in the region of said aperture.

20. In a wave guide system having a T-junction of first and second wave guides, a compound protective electrical breakdown device including first and second conducting barriers located transversely of said first guide and separated by an odd number of electrical quarter wave lengths of the oscillations in said system, each of said barriers having an elongated aperture therein being so dimensioned that it is resonant at the frequency of oscillations transmitted by said system and that a discharge will occur across said aperture at a predetermined amplitude of said oscillations, said first barrier being located at substantially an integral number, including zero, of electrical half-wave lengths from said T-junction and said second barrier having means for maintaining a partial vacuum in the region of its aperture.

21. A hollow pipe wave guide, first and second conductive barriers therein each containing an aperture comprising in its bounding surfaces a circuit resonant to a frequency freely transmissible by said wave guide, said first and second barriers being spaced one from the other a distance substantially equal to an odd number of quarter wave lengths at the aforesaid frequency.

22. Apparatus in accordance with claim 21 and means mounted on said second barrier for causing the aperture in said second barrier to require a lower voltage to cause electrical breakdown thereacross than is required for electrical breakdown across the aperture in said first barrier.

23. Apparatus in accordance with claim 21 including means secured to said second barrier for maintaining a partial vacuum in the space defined by the aperture therein.

24. Apparatus in accordance with claim 21 including means located within the aperture in said second barrier for maintaining the region defined by said aperture in an ionized state.

25. Apparatus in accordance with claim 21 and means secured to said second barrier for maintaining a partial vacuum in the space defined by the aperture therein and means located within said vacuum maintaining means for maintaining the region thereby enclosed in an ionized state.

26. In a wave guide system having a junction of a first wave guide with a second wave guide, protective apparatus comprising, first and second electrical breakdown devices positioned within said first wave guide and separated from each other at their respective points of breakdown an odd number of quarter wave lengths of the energy within said guide, said first breakdown device being located at substantially an integral number, including zero, of electrical half wave lengths from said junction.

27. Apparatus in accordance with claim 26 and means associated with said second device for rendering said second electrical breakdown device more sensitive than said first breakdown device.

28. Apparatus in accordance with claim 26 including means associated with said second breakdown device for maintaining a partial vacuum in the region surrounding the point of electrical breakdown therein.

29. Apparatus in accordance with claim 26 including means associated with said second breakdown device for ionizing the region surrounding the point of electrical breakdown therein.

30. Apparatus in accordance with claim 26 including means associated with said second breakdown device for maintaining a partial vacuum in the region surrounding the point of electrical breakdown therein and means disposed within said vacuum maintaining means for ionizing the region surrounding said point of electrical breakdown.

31. In a wave guide system having a junction of a first wave guide with a second wave guide, protective apparatus comprising a conductive barrier positioned in said first wave guide at substantially an integral number, including zero, of half wave lengths at the frequency of operation of said system from said junction and containing an aperture comprising in its bounding surfaces a circuit resonant to said frequency, and a resonator structure having a discharge gap therein positioned in said first wave guide, said gap being separated from said barrier by an odd number of quarter wave lengths at said frequency.

32. Apparatus in accordance with claim 31 and means surrounding said resonator for maintaining a partial vacuum in the region of said discharge gap.

33. Apparatus in accordance with claim 31 and means positioned within said resonator for maintaining the region surrounding said discharge gap in an ionized state.

34. Apparatus in accordance with claim 31 and means surrounding said resonator for maintaining a partial vacuum in the region of said discharge gap and means located within said last-mentioned means for constantly maintaining a region surrounding said discharge gap in an ionized state.

35. In combination, a dielectric wave guide of the hollow pipe type, first and second conducting walls lying in planes substantially transverse to the direction of wave propagation through said wave guide and each having therein an aperture tuned to a resonance frequency, said first and second walls being spaced one from the other a distance substantially equal to an odd number of quarter wave lengths at said resonance frequency, and means associated with the aperture in said second wall for establishing within the vicinity thereof a region of charged electric particles.

36. In combination, a dielectric wave guide of the hollow pipe type, first and second conducting walls lying in planes substantially transverse to the direction of wave propagation through said wave guide and each having therein an aperture tuned to a resonance frequency, said first and second walls being spaced one from the other a distance substantially equal to an odd number of quarter wave lengths at said resonance frequency, and an envelope secured to said second wall and enclosing the aperture therein for maintaining a partial vacuum in the space defined by said aperture to promote ionization and electrical breakdown therein.

37. In combination, a dielectric wave guide of the hollow pipe type, first and second conducting walls lying in planes substantially transverse to the direction of wave propagation through said wave guide and each having therein an aperture tuned to a resonance frequency, said first and second walls being spaced one from the other a distance substantially equal to an odd number of quarter wave lengths at said resonance frequency, and a pair of bulbous glass members mounted on opposite sides of said second wall and sealed thereto for maintaining a partial vacuum in the vicinity of the aperture formed therein to promote ionization and electrical breakdown therein.

38. In combination, a dielectric wave guide of the hollow pipe type, first and second conducting walls lying in planes substantially transverse to the direction of wave propagation through said wave guide and each having therein an aperture tuned to a resonance frequency, said first and second walls being spaced one from the other a distance substantially equal to an odd number of quarter wave lengths at said resonance frequency, a pair of bulbous glass members mounted on opposite sides of said second wall and sealed thereto for maintaining a partial vacuum in the vicinity of the aperture formed therein, and an electrode positioned in the vicinity of the aperture in said second wall, said electrode being adapted to be impressed with a voltage for ionizing the region in the vicinity of the aperture in said second wall.

39. In a wave guide system having a junction of a first hollow pipe wave guide with a second hollow pipe wave guide, first and second conducting barriers of relatively thin cross-section positioned within said first wave guide and separated from each other an odd number of quarter wave lengths of the energy within said guide, each of said barriers having an aperture therein tuned to the frequency of said energy, said first barrier being located at substantially an integral number, including zero, of electrical half wave lengths from said junction.

40. Apparatus in accordance with claim 39 and a pair of bulbous glass members mounted on opposite sides of said second barrier and sealed thereto for maintaining a partial vacuum in the vicinity of the aperture formed therein to promote ionization and electrical breakdown therein.

41. Apparatus in accordance with claim 39 and an envelope secured to said second barrier and enclosing the aperture therein for maintaining a partial vacuum in the space defined by said aperture, and an electrode positioned within said second barrier and terminating in the vicinity of said aperture, said electrode being adapted for energization to produce ionization in the vicinity of said aperture.

42. In combination, a section of dielectric wave guide of the hollow pipe type and first and second protective electrical breakdown devices positioned within said wave guide and spaced one from the other as measured from their respective regions of breakdown a distance substantially equal to an odd number of quarter wave lengths of the energy propagated within said wave guide.

43. In combination, a system of dielectric wave guides of the hollow pipe type having a junction of a first wave guide with a second wave guide, first and second electrical breakdown devices positioned within said first wave guide and spaced one from the other an odd number of quarter wave lengths of the energy propagated within said system, said first breakdown device being located at substantially an integral number, including zero, of electrical half wave lengths from said junction.

ANDREW LONGACRE.

REFERENCES CITED

The following references are of record in the file of this patent:

UNITED STATES PATENTS

| Number | Name | Date |
|---|---|---|
| 1,035,958 | Girardeau | Aug. 20, 1912 |
| 2,403,302 | Richmond | July 2, 1946 |
| 2,403,303 | Richmond | July 2, 1946 |
| 2,412,161 | Patterson | Dec. 3, 1946 |
| 2,412,315 | Brown | Dec. 10, 1946 |
| 2,413,171 | Clifford et al. | Dec. 24, 1946 |
| 2,425,379 | Lindenblad | Aug. 12, 1947 |
| 2,439,656 | House | Apr. 13, 1948 |
| 2,446,982 | Pound | Aug. 10, 1948 |